Oct. 8, 1929.  R. E. FLAHERTY  1,730,651
CORE INSERTING APPARATUS
Filed Sept. 15, 1928  2 Sheets-Sheet 1
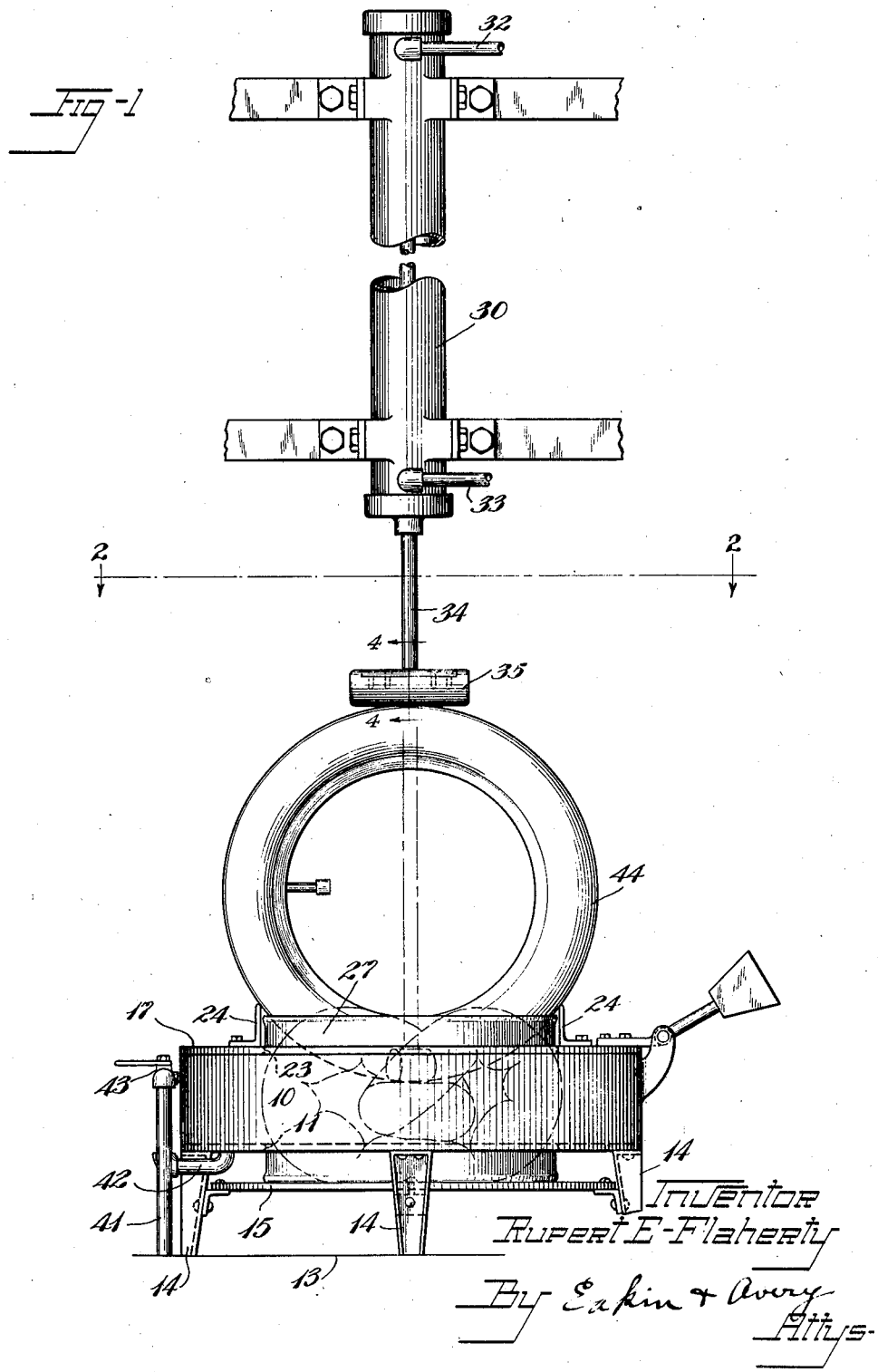

Oct. 8, 1929.  R. E. FLAHERTY  1,730,651
CORE INSERTING APPARATUS
Filed Sept. 15, 1928  2 Sheets-Sheet 2
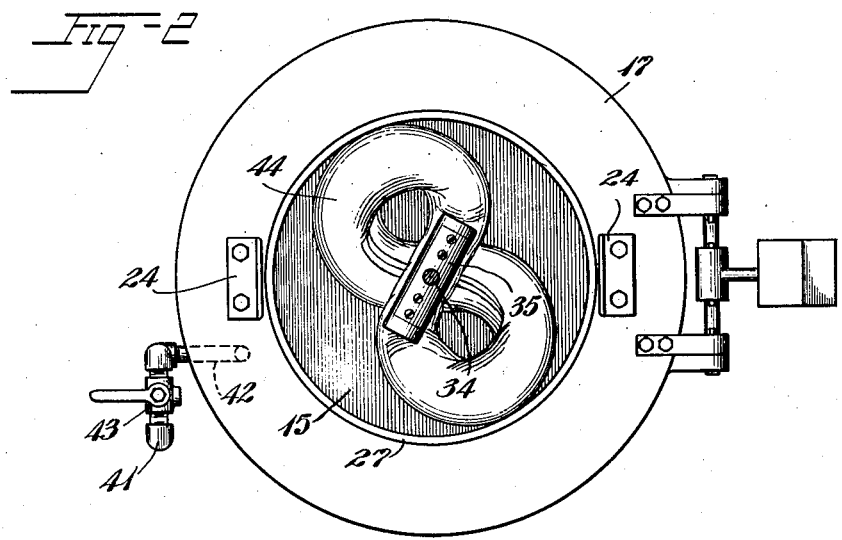
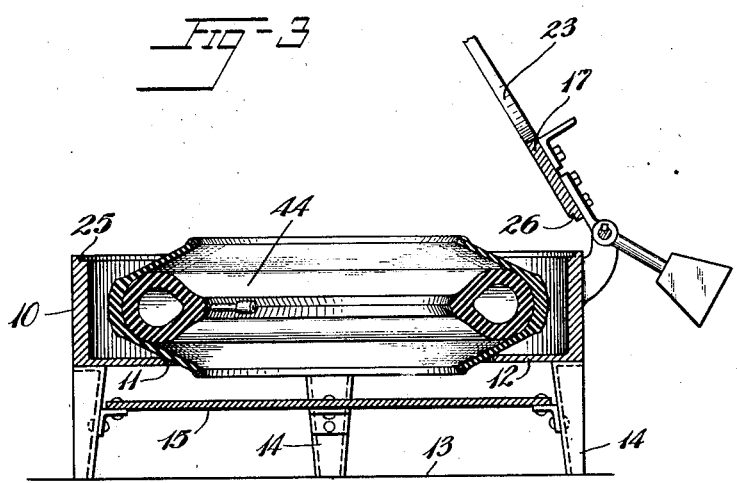
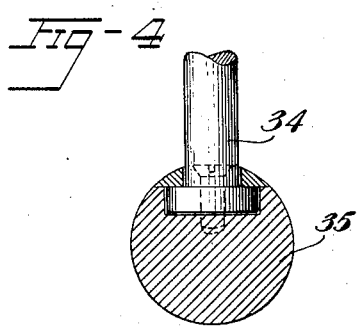
Inventor
Rupert E. Flaherty
By Eakin & Avery
Attys.

Patented Oct. 8, 1929

1,730,651

UNITED STATES PATENT OFFICE

RUPERT E. FLAHERTY, OF CUYAHOGA FALLS, OHIO, ASSIGNOR TO THE B. F. GOODRICH COMPANY, OF NEW YORK, N. Y., A CORPORATION OF NEW YORK

CORE-INSERTING APPARATUS

Application filed September 15, 1928. Serial No. 306,217.

This invention relates to methods and apparatus for folding an expansible tire-vulcanizing core or a similar article and inserting it into a tire structure or the like.

My invention is of especial utility in connection with the manufacture of tires by the flat band or pulley drum method in which an expansible core is inserted into a flat tire band prior to the shaping of the band. Heretofore it has been exceedingly laborious to fold an expansible core to the extent necessary to permit it to be freely inserted into the tire structure, particularly in the case of a large size core.

My chief objects are to provide an improved method and improved apparatus for performing core-inserting and analogous operations.

Of the accompanying drawings:

Fig. 1 is a side elevation of my apparatus with the work therein, an expansible core being shown in its first position in full lines and a later position of the core being indicated in broken lines.

Fig. 2 is a plan view of the apparatus on the line 2—2 of Fig. 1, the core being shown in folded condition.

Fig. 3 is a vertical section through a portion of the apparatus showing a partly-shaped tire band with a core in place therein in its final position, part of the apparatus being broken away.

Fig. 4 is a vertical section on the line 4—4 of Fig. 1.

Referring to the drawings, the apparatus comprises an annular box structure for vacuum-shaping of a transversely-flat tire band to approximately tire form, the box structure comprising a fixed member 10 open at its inner periphery and at the top and having a central opening 11 in its bottom 12. The said member 10 is suitably supported upon a floor 13 by means of a plurality of legs 14, 14 secured to the bottom of the box. A horizontally-arranged circular supporting plate 15 is rigidly supported upon the legs 14, 14, at a level substantially below that of the bottom 12 of the box structure.

The box member 10 has an annular cover 17 hinged thereto and provided with a counterweight 21.

The cover 17 has a circular central opening 23 therein of substantially the same diameter as the opening in the bottom 12 of the box. A pair of core-positioning and supporting members 24, 24 are rigidly secured to the upper surface of the cover 17 on opposite sides of the central opening 23 with upstanding portions thereof parallel to each other and tangentially disposed with relation to the opening. The upper margin of the fixed member 10 of the box structure and the lower outer edge of the cover 17 preferably are complementally rabbeted, at 25 and 26, respectively, for securing a fluid-tight fit between them.

The arrangement of the box member 10 with relation to the circular plate 15 is such that when a flat tire band 27 is positioned in the box structure so as to extend through the respective openings 11 and 23 in the bottom of the box member 10 and in the cover 17 and be supported on the plate 15 its top margin will lie substantially the same distance above the cover 17 as its lower margin lies below the opening 11 in the box member 10.

For applying suction to the interior of the box structure to expand the middle portion of the flat tire band supported on the plate 15 as just described a pipe 41 leads from a suction line and is connected to the interior of the box member 10 through a branch pipe 42. A valve 43 is provided in the pipe 41 for connecting the interior of the box structure selectively with the suction line and with the atmosphere.

For folding and inserting an expansible core into a flat tire band positioned as described a mechanism is provided comprising a vertically-disposed fluid-pressure cylinder 30 fixedly mounted over the center of the vacuum-expanding device, the cylinder 30 having connected thereto near its respective ends fluid inlet and outlet pipes 32, 33. The piston rod 34 of the cylinder has swivelled thereon at its lower end a cylindrical, horizontally-disposed head or presser bar 35, the piston rod being swivelled to the bar at a point midway of the ends of the latter.

In the operation of the apparatus, the cover 17 is lowered to position on the top edge of the box structure 10, the piston rod 34 being in its upper, retracted position.

A flat tire band 27 is then inserted within the inner periphery of the annular box structure and allowed to rest upon the circular plate 15, the tire band approximately fitting in the circular openings in the cover 17 and the floor of the member 10, as shown in Fig. 1.

An expansible core 44 is thereafter positioned vertically upon the upstanding portions of the respective core-positioning and supporting members 24, 24, with the entire weight of the core resting upon the said members 24, which serve to prevent injurious pressure upon the tire band during the subsequent insertion of the core into the tire band. The swivelled presser bar 35 is then positioned longitudinally of and upon the top of the core and the piston rod 34 is actuated to move the bar downward, force being applied to the upper portion of the core in a radial direction approximately parallel to the middle plane of the core producing a reentrant fold.

I find that because of inevitably unbalanced forces of resistance in the core the upper portions of the core including those portions at each side of the downwardly moving bar, twist so as to overlap each other, in some instances twisting into a figure-8 shape as viewed in plan (Fig. 2), the swivelled bar freely permitting such twisting movement and continuing its engagement with the core.

As the two loop portions of the folded core, which are then its uppermost portions, reach positions adjacent the middle portion of the tire band the forces developed in the core by the twisting and buckling thereof cause an outward pressure of the core against the tire structure such that the said loop portions form sufficient bays in the tire band to permit the core to be interlocked with and within the tire band and retained by its own resilience therein.

The presser bar is then retracted from contact with the folded core, to its raised position, after which the tire band is expanded approximately to tire shape by applying suction to the box structure and the core is then manually manipulated to remove the folds therefrom and cause it to spring out into and to fit within the tire structure.

When the core thus has been properly positioned the core is suitably inflated to hold the expanded tire band approximately to shape, the suction in the box 10 is broken, the lid 17 is manually raised and the tire structure containing the inflated core is lifted from the box, to be enclosed in a mold and vulcanized in the usual manner.

By the use of my improved method and apparatus I am able to effect the various objects of my invention, and to utilize for the purpose apparatus of simple construction which is easy to operate, while at the same time I effect a substantial saving in labor costs and secure a desirable uniformity in results.

My invention may be modified within the scope of the appended claims.

I claim:

1. Core-inserting apparatus comprising a support adapted to embrace a substantially unshaped tire band, means associated therewith adapted for folding an expansible core and for mounting the latter in such shape within an unshaped tire band embraced by the support, means for expanding the tire band sufficiently to shape the latter to tire form and to permit the seating of the folded core in its normal circular form within the shaped band.

2. Core-inserting apparatus as defined in claim 1 in which the means for mounting the expansible core within the tire band comprises mechanism for applying a force to the expansible core at approximately the middle plane thereof and in a direction toward the said support.

3. Apparatus as defined in claim 1 in which the said folding means comprises a piston rod having a transversely-arranged head swivelled on an end thereof.

4. Core-inserting apparatus comprising means for supporting a transversely-flat tire band, means for folding a resiliently-flexible core and for interlocking the folded core with and within a transversely-flat tire band positioned on the said support, and suction means for expanding the tire band approximately to tire shape.

5. Core-inserting apparatus comprising a support for a tire structure, means for supporting an annular expansible core adjacent the tire structure with the plane of the latter transversely arranged with respect to the plane of the core, mechanism cooperating with the said tire-structure support for forming a reentrant fold in an expansible core and for moving the folded core into a tire structure on the said support while permitting free twisting movement of the core.

6. Apparatus as defined in claim 5 in which the last-named mechanism includes a force-applying element movable toward and away from the tire-structure support and having a head swivelled on the end thereof.

7. Apparatus as defined in claim 5 including means associated with the said tire-structure support for expanding the tire structure to permit reshaping of the folded core to annular form within the tire structure.

8. Core-inserting apparatus comprising a tire-supporting box structure having a central opening at an end thereof, means for inserting in the said structure an expansible normally-circular core in folded condition, and means associated with the box structure for expanding the middle portion of a tire structure positioned in the box structure for enlarging and reshaping the tire structure sufficiently to allow the seating of the expansible core therein in its normally-circular form.

In witness whereof I have hereunto set my hand this 10th day of September, 1928.

RUPERT E. FLAHERTY.